United States Patent [19]
Sakuraba

[11] 3,720,110
[45] March 13, 1973

[54] METHOD AND APPARATUS FOR DETECTING ANGULAR POSITION AND AMOUNT OF DYNAMIC UNBALANCE OF ROTATING BODY

[75] Inventor: Hirosi Sakuraba, Kanagawa-ken, Japan

[73] Assignee: International Mechanical Vibration Laboratory, Inc., Osaka-shi, Osaka, Japan

[22] Filed: Aug. 13, 1971

[21] Appl. No.: 171,460

[52] U.S. Cl. .......................................73/460, 73/461
[51] Int. Cl. ............................................G01m 1/16
[58] Field of Search...........73/66, 459, 460, 461, 462

[56] References Cited

UNITED STATES PATENTS 3,130,576 4/1964 Giers et al. ...............................73/66

*Primary Examiner*—James J. Gill
*Attorney*—Robert D. Flynn et al.

[57] ABSTRACT

A method and apparatus for detecting the angular position and amount of a dynamic unbalance of a rotary body by detecting the direction and magnitude of a displacement of the normal axis of rotation of a rotationally vibrated rotary body, the displacement corresponding to the position and amount of the unbalance of said rotary body. The rotary body is rotationally vibrated within a minute angular range around its own normal axis of rotation and is resiliently supported to two spaced points along said axis so that it may be displaced in a plane perpendicular to said axis. As a result, said normal axis of rotation of the rotary body is displaced as a function of the angular position and amount of the unbalance of the rotary body. The magnitude and direction of the displacement are detected, whereby the angular position and amount of the dynamic unbalance of the rotary body are detected.

8 Claims, 5 Drawing Figures

F
P1
mr
SB4
SB1
B
20
ω
B'
SB2
SB3
O1
O2
d
SA1
A'
ω
SA4
A
SA2
SA3
mr
P2
F 2
5
3
4
R1
R
R2
4'
3'
5'
2'

7
8
81
82
83

6
b
a
33
32
37
35
4
$R_1$
7
8
34
31
35
36
θ

METHOD AND APPARATUS FOR DETECTING ANGULAR POSITION AND AMOUNT OF DYNAMIC UNBALANCE OF ROTATING BODY

BACKGROUND OF THE INVENTION

The present invention relates to apparatus for detecting the angular position and amount of a dynamic unbalance of a rotary body.

If a rotary body such as, for example, a rotor in an electric motor has a dynamic unbalance, the centrifugal whirling of the shaft is caused at rotation, so that no stable rotation is attainable. In addition, breakage of the rotary shaft and/or damage of the rotor itself or the peripheral equipments are also brought about. Therefore, the rotary body is required to have no dynamic unbalance. However, it is extremely difficult to manufacture the rotary body including no unbalance at the manufacturing step thereof. Accordingly, the general procedure has been that, after the manufacture of the rotary body, a part of the rotary body is cut off or a small piece is fixed to a part of the rotary body in dependence upon the position and amount of the dynamic unbalance of the rotary body, thereby removing the dynamic unbalance. In this case, it is very important to know the amount and position of the dynamic unbalance of the manufactured rotary body.

A known apparatus for detecting the position and amount of an unbalance of a rotary body as are required for the correction of the dynamic balance of the rotary body, comprises means to rotate the rotary body at a constant speed, means to detect in the form of signals the centrifugal whirling of the shaft due to a dynamic unbalance of the rotary body during its rotation, reference-signal generator means, and means to make comparisons between the detected signal and the reference signal, whereby the angular position and amount of the dynamic unbalance of the rotary body are detected.

To know the position and amount of the dynamic unbalance of the rotary body by rotating it at a constant speed, is a preferable detecting method since the dynamic unbalance can be detected in the same condition as the actual state of use of the rotary body. Since, however, the detector means for the centrifugal whirling of the shaft, the reference-signal generator means, and the means for carrying out the comparison between the detected signal and the reference signal are required, the apparatus is complicated. Moreover, as regards a rotary body susceptible to air resistance during rotation, such as a fan, one large in miscellaneous vibrations, such as an anti-friction bearing, or one large in deflection, the detection of the dynamic unbalance has been difficult with the detecting method as described above.

OBJECTS OF THE INVENTION:

It is accordingly an object of the present invention to provide a method and/or apparatus for detecting the angular position and amount of a dynamic unbalance without rotating a rotary body at a constant speed.

A further object of the present invention is to provide a method and apparatus according to which the angular position and amount of a dynamic unbalance of a rotary body may be detected without any step of processing electrical signals.

A still further object of the present invention is to provide apparatus suitable to detect the angular position and amount of a dynamic unbalance of rotary bodies, such as a fan and an anti-friction bearing, as have been undetectable with prior-art detector apparatus.

Another object of the present invention is to provide an apparatus for detecting the angular position and amount of a dynamic unbalance of a rotary body, which apparatus is simple in construction and in handling and is low in cost.

SUMMARY OF THE INVENTION

According to the present invention, the angular position and amount of a dynamic unbalance of rotary body is detected by resiliently supporting the rotary body at at least two spaced points along the normal axis of rotation of the rotary body so that the support points are resiliently restrained for motion in any direction in planes transverse to the axis. Rotational vibration within a minute angular range about the normal axis of rotation of the rotary body is imparted to the rotary body so that the rotary body causes the generation of the displacement of the normal axis of displacement thereof due to the dynamic unbalance thereof. The displacement of the normal axis of rotation of the rotary body is detected to thereby detect the amount and angular position of the dynamic unbalance of the rotary body which is a function of the displacement. The present invention contemplates both the method and apparatus for carrying out the above inventive concept.

Herein, the expression "the rotational vibration within a predetermined minute angular range" means a repetitive motion consisting of forward rotations of the chucks over a minute angle and backward rotations by the same angle as in the forward rotations.

Further features, objects and concrete constructions for realizing them, of the present invention will be readily understood from the following description of the preferred embodiments of the invention taken in conjunction with the accompanying drawings.

DETAILED DESCRIPTION OF THE PREFERRED EMBODIMENTS

Figure 1:
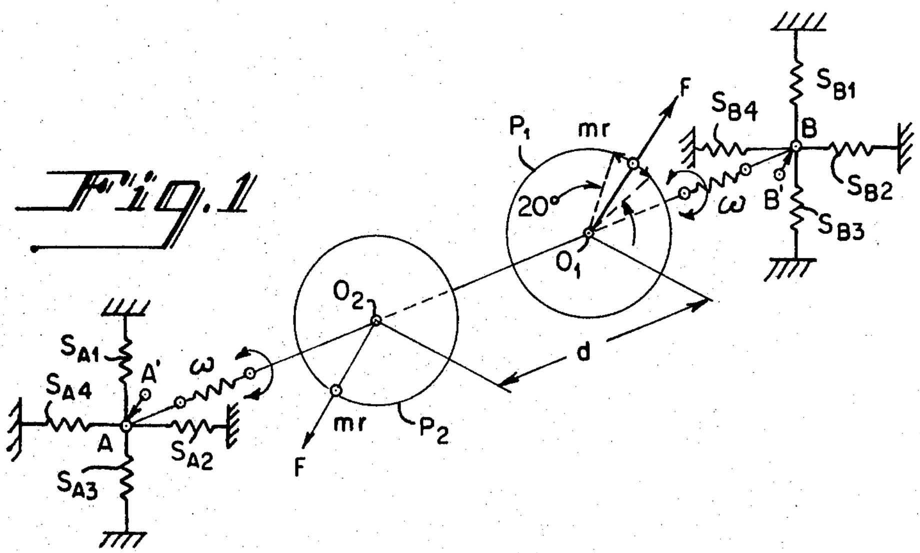
FIG. 1 is a schematic view for explaining the operating principle of apparatus of the present invention.

Referring to FIG. 1, a disc $P_1$ has an unbalance of a mass $m$ (which is termed the static unbalance) in a place at a distance $r$ from the center thereof. Then, the mean value $\overline{F}$ of a centrifugal force exerted upon the unbalanced portion of the disc $P_1$ when the disc is rotationally vibrated within a minute angular range about its axis, is calculated as follows:

An angular amplitude $\theta$ at the unbalanced part is $$\theta = \theta_0 \sin wt \quad (1)$$

where $\theta_0$ represents the maximum angular amplitude, while $w$ the angular velocity which is expressed by $2\pi f$ if the frequency is assumed to be $f$. $t$ indicates the time.

On the other hand, sice the unbalanced part is conducting a circular motion at an optional time during the vibration, a centrifugal force F acting upon the unbalanced portion may be expressed, on the assumption that the angular velocity at that time be $a$, as below.

$$F = m\, r\, a^2 \quad (2)$$

Since, on the other hand, the angular velocity $a$ is given as the differentiated value of $\theta$ in expression (1) with respect to time expression (2) is transformed as follows:

$$F = m\, r\, (d\theta/dt)^2$$

$$= m\, r\, [(d/dt)\, (\theta_0 \text{Sin Wt})]^2$$

$$= m\, r\, (\theta_0 W \cos \text{Wt})^2$$

$$= m\, r\, \theta_0^2\, W^2 \cos^2 wt$$

Accordingly, the average value $\overline{F}$ of this centrifugal force $$\overline{F} = \frac{1}{T}\int_0^T F dt = \frac{1}{T}\int_0^T mr\theta_0^2 W^2 \cos^2 wt dt$$

$$= \frac{mr\theta_0^2 w^2}{T}\int_0^T \cos^2 wt dt$$

$$= \frac{mr\theta_0^2 w^2}{T}\cdot\frac{1}{2}\left[\frac{\sin 2wt}{2} + t\right]_0^T$$

Herein, T is the period and $T = 1/f = 2\pi/w$, so that $$\overline{F} = (m\, r\, \theta_0^2\, w^2 I) \cdot ½\, T$$

$$= ½\, m\, r\, w^2\, \theta_0^2 \quad (3)$$

If the maximum amplitude $\theta_0$ is made small, the direction in which the average centrifugal force F acts is fixed, in effect, to the direction which connects the center of the vibration of the unbalanced part and the rotational center or the center $O_1$ of the disc $P_1$.

Accordingly, if the rotational vibration as described above is imparted to the disc $P_1$, the center axis of the disc $P_1$ is displaced in the direction in which there is the unbalance and by an amount which corresponds to the magnitude of the unbalance. Therefore, the angular position and the amount of the unbalance may be detected by observing the displacement of the center axis.

In order to allow the displacement of the center axis, the rotary shaft of the disc $P_1$ may be resiliently supported by springs or the like, in FIG. 1, the supporting means are illustrated as being springs $S_{A1}$ to $S_{A4}$ and $S_{B1}$ to $S_{B4}$.

Also shown in FIG. 1 is a disc $P_2$, as to which the position and amount of an unbalance thereof may be detected from the direction and magnitude of the displacement of the dislocation or deviation of the axis as in the above-mentioned disc $P_1$.

An actual rotary body has a thickness in its axial direction, and may be considered as one in which innumerable discs each having a static unbalance are closely arranged. It is accordingly deemed that, in an actual rotary body, the dislocations of axes due to the innumerable unbalances arranged in the axial direction are composed when it is rotated, thus equivalently producing the static unbalance at the right and left side parts of the rotary body. The correction of the dynamic balance may be done by eliminating the equivalent static unbalance.

It will be apparent from the principle in FIG. 1 that, in regard also to a rotary body having a thickness in the axial direction, the position and amount of the equivalent static unbalance or dynamic unbalance as appearing on both sides of the rotary body are detected by rotationally vibrating it within a minute angular range.

Herein, a centrifugal force $F$ due to the static unbalance when the disc $P_1$ is rotated, is represented by:

$$F = m\, r\, w^2 \quad (4)$$

The number of revolutions N per minute in this case is as below, the angular velocity and the period of rotation being respectively indicated by $w$ and $f$.

$$N = 60f = 60\, (w/2\pi) \quad (5)$$

From expressions (4) and (5), $$N = 60/2\pi = \sqrt{F/mr} \quad (6)$$

In general, if the centrifugal force $F$ when a mass $m$ at a point distant by $r$ from the center is rotated about the center is known, its number of revolutions per minute may be calculated from expression (6).

Accordingly, by substituting $\overline{F}$ in the previous expression (3) into $F$ in expression (6), the equivalent number of revolutions $N$ when the disc is rotationally vibrated at the frequency of $f$ and the angular amplitude of $\theta_0$ may be evaluated. That is, $$N = 60/2\pi\ 29 \sqrt{\overline{F}/mr}$$

$$= \frac{60}{2\pi}\sqrt{\frac{\frac{1}{2}\, mrw^2\theta_0^2}{mr}}$$

$$= 42.4\, f\, \theta_0 \ (7)$$

Assuming now that $f = 300$Hz and $\theta_0 = 0.1$rad, the mean centrifugal force $\overline{F}$ and the number of revolutions $N$ are calculated from expressions (3) and (7):

$$\overline{F} = 2 \times 900 \times \pi^2 \times m\, r \quad (8)$$

$$N = 1272$$

Now, if the disc $P_1$ is rotated so as to produce the same centrifugal force as in expression (8), its number of revolutions $N$ and its rotational frequency $f$ are given from expression (4)

$$F = 2 \times 900 \times \pi^2 \times m,\ r = m\, r\, w^2$$

$$w = \sqrt{2} \cdot 30 \cdot \pi$$

and from expression (5)

$$N=1272$$

$$f=21.2$$

This value of $N$ is equal to the equivalent number of revolutions in the case where the disc is rotationally vibrated.

Accordingly, it will be understood from this fact that the rotational vibration of the disc within a minute angular range around the axis and the rotation of the disc are regarded as being equivalent in the detection of the unbalance.

On the other hand, in case of the rotational vibration, the direction of the centrifugal force due to the unbalance, accordingly the direction of the displacement of the axis varies only within the minute angular range, so that the direction may be substantially regarded as being stationary.

It will accordingly be understood that a dynamic unbalance of a rotary body is statically measured as the displacement of its axis by rotationally vibrating the rotary body within a minute angular range about said axis.

Figure 2:
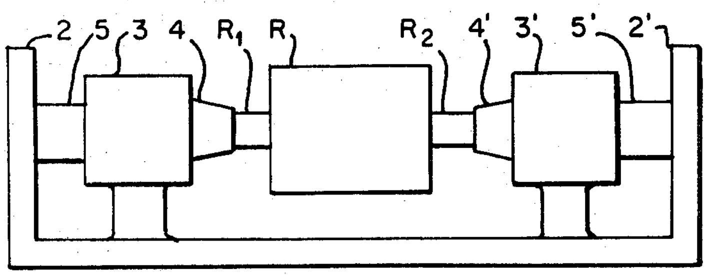
FIG. 2 is a front view of an apparatus embodying the present invention.

Referring to FIG. 2, which shows a front view of an embodiment in which the present invention is applied to the case of detecting the position and amount of a dynamic unbalance of a relatively small-sized rotor, the apparatus comprises a base 1, frames 2 and 2' vertically raised from the right and left ends (as seen in the figure) of the base 1 and fixed to the base 1, two driving devices 3 and 3' mounted on the base 1 and the respective frames 2 and 2', chucks 4 and 4' driven by the respective driving devices and for driving a rotary body R, and unbalance detecting devices 5 and 5'.

The chucks 4 and 4' oppose to each other, and are arranged at such positions that their center axes are located on an identical axis, that the rotary body R may be inserted therebetween, and that the rotary body R may be supported shafts $R_1$ and $R_2$ thereof. The chucks 4 and 4' are fixed to driving shafts (34 in FIGS. 3 and 4) of the driving devices 3 and 3', respectively, while the driving devices 3 and 3' are elastically supported in such manner that the driving shafts are normally located on an identical axis.

Accordingly, when the driving devices 3 and 3' are driven to rotationally vibrate the rotary body R within a minute angular range about its rotary axis, the shafts $R_1$ and $R_2$ conduct the displacement, on the basis of the foregoing principle, due to the dynamic unbalance of the rotary body and in conformity with the magnitude and the direction of the angular position of the unbalance. Since the shafts $R_1$ and $R_2$ are coupled to the driving shafts by means of the chucks 4 and 4' and the driving devices having the driving shafts are resiliently supported, a force to displace the shafts $R_1$ and $R_2$ becomes a force to displace the driving devices 3 and 3', and the driving devices 3 and 3' are displaced until this force and the resilient supporting force are balanced with each other. Accordingly, the position and amount of the dynamic unbalance of the rotary body R may be determined by detecting the displacement by means of the detecting devices 5 and 5'.

It will be easily understood from the foregoing explanation that, as the detecting devices 5 and 5', there may be used various detecting devices for a static force or for a displacement, such as a spring balancer, a parallel spring mechanism, and a combination of a strain gauge and an RC, and a oscillator the strain gauge serving as the resistive (R) element of the oscillator to vary the frequency of the oscillator as a function of the strain applied to the strain gauge.

Figures 3, 4:
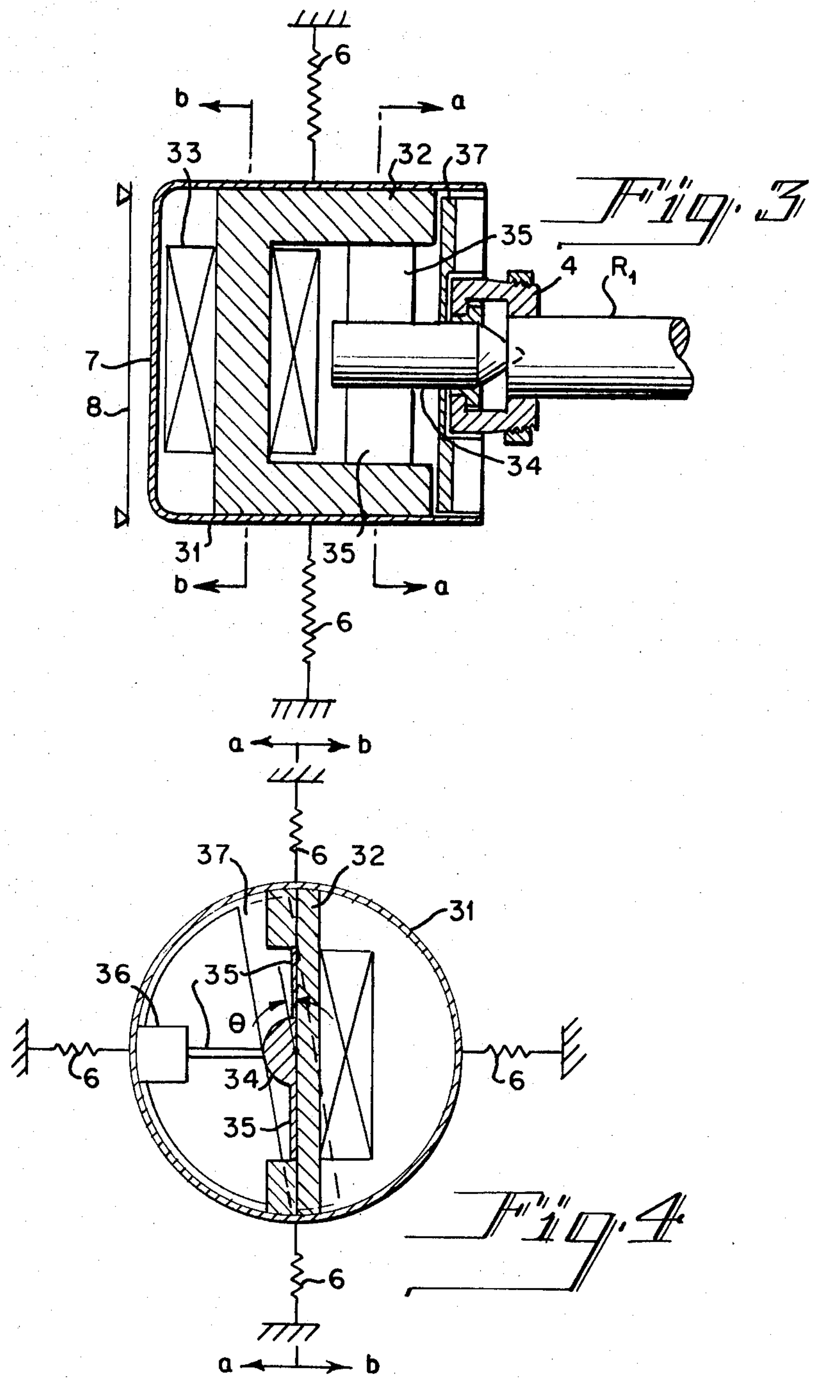
FIG. 3 is a sectional view showing the construction of bearing and vibrating means which is used in the apparatus shown in FIG. 2.
FIG. 4 is a combined sectional view taken along line $a - a$ and line $b - b$ in FIG. 3, the left half of the figure showing a sectional view along the line $a - a$ and the right half a sectional view along the line $b - b$.

Referring now to FIGS. 3 and 4, description will be made of the construction of an embodiment of the driving device. Diagrammatically shown in the figures are the construction for the resilient support, the detecting device, and the construction of the chuck.

The driving device comprises a cylindrical housing 31 closed at one end and open at the other end, an electromagnet in which a horse-shoe-shaped yoke 32 made of a magnetic substance has a winding 33 wound thereon, a driving shaft 34 which extends along the center axis between two legs of the yoke 32, four leaf springs 35 for holding the driving shaft 34 at its position, to spring bearings 36 for supporting two of the leaf springs, and a magnetic-substance piece 37 made of such material as iron which is fixed to the driving shaft 34 and which has a length substantially equal to the length across the legs of the yoke 32.

Each of the flat springs 35 has one end fixed to the driving shaft 34 and has the other end fixed to the leg of the yoke 32 or the spring bearing 36, with the result that the driving shaft extends at such position. The iron piece 37 fixed to the driving shaft 34 is secured in a manner to be dislocated by a minute angle $\theta$ around the center axis of the driving shaft 34 with respect to a line connecting the leg portions of the yoke 32.

When a current flows through the winding 33, a magnetic flux is generated through the yoke 32. As a result, the iron piece 37 is turned in the direction of closing a magnetic circuit through which the magnetic flux passes, until both ends of the iron piece oppose the end faces of the legs of the yoke 32. Herein, if the current to the winding 33 is interrupted, the iron piece returns to the original position by the elasticity of the leaf springs 35. Therefore, when an alternating current is applied to the coil 33, the iron piece 37 and accordingly the driving shaft 34 are rotationally vibrated within the range of the minute angle $\theta$ about its center axis.

To the driving shaft 34, the chuck 4 is fixed. The chuck 4 is secured to the driving shaft 34 such that its center is located on the center axis of the driving shaft 34, while it grips the shaft $R_1$ of the rotary body and thus supports the rotary body so as to make the center axis of the rotary body and that of the driving shaft 34 coincide with each other.

Since the chuck 4 has hitherto been widely known in a variety of mechanical devices, the detailed explanation is omitted herein. Among chucks having heretofore been used, there are included various ones such as the independent chuck, the universal chuck, and the like. Any chuck may be employed.

The housing 31 is resiliently supported by, e. g., four springs 6 arranged on an identical plane, with the result that it may be displaced in optional directions within the plane (within a plane parallel to the drawing as viewed in FIG. 4).

Figure 5:
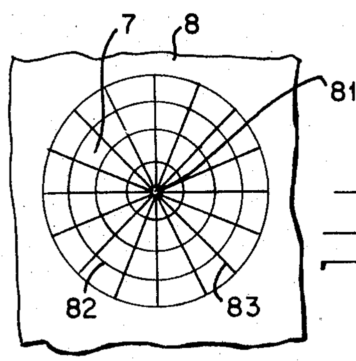
FIG. 5 is a view showing a reference mark and a scale plate.

On the other hand, a reference mark 7 is provided at a part of the closed end face of the housing 31, while a flat transparent or semi-transparent scale plate 8 is disposed in a manner to oppose to said end face. As shown in FIG. 5, the scale plate 8 has a plurality of concentric circles 82 with respect to a central point 81 and straight lines 83 radially extending from the central point 81. It is graduated such that the concentric circles indicate a displacement or force, or the magnitude of a dynamic unbalance, while the straight lines 83 represent the angular scale, and thus, it is previously adjusted so as to cause the central point 81 and the reference mark 7 to coincide. Herein, when the rotary body R is rotationally vibrated by driving the driving device 3, it is intended to conduct a displacement in dependence on its dynamic unbalance as has been stated above. As a result, the driving device 3 is displaced against the elasticity of the springs 6. Accordingly, the position and amount of the dynamic unbalance may be determined by reading a scale on the scale plate 8 at the position to which the reference mark 7 has moved, i.e., a graduation indicated by the concentric circles 82 and a graduation indicated by the straight lines 83.

It will be readily understood that, while the detecting device 5 has been composed of the reference mark 7 and the scale plate 8, it may otherwise be constructed such that e. g. the extension and contraction of the respective springs 6 are detected by means of, for example, a strain gauge to evaluate the position and magnitude of the dynamic unbalance from the detected values.

While, in the foregoing, the present invention has been described of the specific embodiments thereof, it will be easily understood that the invention is not restricted to the described embodiments, but that a variety of designs and modifications may be made within the scope of the present invention.

What is claimed:

1. A method for detecting the angular position and amount of a dynamic unblance of a rotary body, comprising the steps of:

resiliently supporting the rotary body at at least two spaced points along the normal axis of rotation of the rotary body so that the at least two support points are resiliently restrained for motion in any direction in planes transverse to said axis;

imparting to said rotary body a rotational vibration within a minute angular range about the normal axis of rotation thereof, so that said rotary body is caused to generate a displacement of said normal axis of rotation due to the dynamic unbalance thereof; and detecting the magnitude and direction of said displacement of said normal axis of rotation of said rotary body to thereby detect the amount and angular position of the dynamic unbalance of said rotary body.

2. Apparatus for detecting the angular position and amount of a dynamic unbalance of a rotary body comprising:

means for resiliently supporting said rotary body at at least two spaced points along the normal axis of rotation of said rotary body so that the at least two support points are resiliently restrained for motion in any direction in planes transverse to said axis;

means to impart to said rotary body a rotational vibration within a minute angular range about the normal axis of rotation thereof, so that said rotary body is caused to generate a displacement of said normal axis of rotation due to the dynamic unbalance thereof; and means to detect the magnitude and direction of said displacement of said normal axis of rotation of said rotary body to thereby detect the amount and angular position of the dynamic unbalance of said rotary body which is a function of said displacement.

3. Apparatus for detecting the angular position and amount of a dynamic unbalance of a rotary body comprising:

a base;

two driving devices mounted on said base in opposing relation to each other, said driving devices carrying said rotary body at two spaced points along the normal axis of rotation of said rotary body and imparting rotational vibration to said rotary body;

resilient support means for resiliently mounting each of said two driving devices to said base so that said driving devices and said rotary body are resiliently restrained for motion in any direction in planes transverse to said axis; and means to detect displacement of the resiliently supported driving devices caused by the rotational vibration of said rotary body to thereby detect the angular position of said rotary body which is a function of said displacements.

4. Apparatus according to claim 3 comprising chuck means on said driving devices for gripping said rotary body and mounting said rotary body to said driving means.

5. Apparatus according to claim 4 wherein each of said two driving devices comprises:

a cylindrical housing closed at one end and opened at the other end;

an electromagnet including a horse-shoe-shaped yoke received in said housing and a coil wound thereon, a separated part of said yoke being located at the open end of said housing;

a driving shaft extending on the center axis of said housing and externally protruding out of said open end of said housing;

resilient support means for fixing said driving shaft in position and for supporting said driving shaft such that said driving shaft is capable of being driven about its own axis by an external force and is returnable to its original position when said external force is removed, said resilient support means comprising a plurality of spring means, each spring means having one end fixed outside said housing of said each driving devices, each spring means extending substantially in the radial direction of said housing, and each spring means having the other end fixed to said base; and a magnetic-substance piece fixed to the protruding part of said driving shaft and extending in the radial direction of said housing, said magnetic-substance piece being deviated from said yoke by a minute angle around said center axis of said housing while said electromagnet is not energized, in order to prevent said separated part of said yoke from being short circuited;

each of said chucks being fixed to the protruding end of said driving shaft of the corresponding one of said two driving devices; and said displacement detecting means comprising means for detecting the amount of change of each of said plurality of spring means and for operating on said amounts thereby detecting to determine the direction and magnitude of the displacement of said driving devices.

6. Apparatus as claimed in claim 5 wherein said displacement detecting means comprises a reference mark provided on the outer surface of said closed end of said housing of each of said driving devices and a scale plate fixed to said base opposed to said closed end, said scale plate comprising a plurality of concentrically circular scale lines for indicating the amount of displacement and radially directed straight linear scale lines for indicating the angle of the displacement, the deviation of said reference mark from the central position of said scale plate indicating the angular position and amount of the dynamic unbalance.

7. Apparatus as claimed in claim 6 wherein said scale plate is transparent.

8. Apparatus as claimed in claim 6 wherein said scale plate is semi-transparent.

* * * * *